United States Patent [19]

Tacchi et al.

[11] Patent Number: 5,894,919
[45] Date of Patent: Apr. 20, 1999

[54] MOBILE TRUCK WITH TRANSPORT PLATFORM THAT CAN BE POSITIONED AT A NUMBER OF LEVELS

[75] Inventors: Renato Tacchi, Lonate Pozzolo-VA; Luciano Longhi, Busto Arsizio-VA, both of Italy

[73] Assignee: Sandvik AB, Sandviken, Sweden

[21] Appl. No.: 08/751,104

[22] Filed: Nov. 15, 1996

[30] Foreign Application Priority Data

Nov. 16, 1995 [IT] Italy ................................. MI950785 U

[51] Int. Cl.⁶ ..................................................... B65G 47/46
[52] U.S. Cl. .................................. 198/370.06; 198/370.01; 414/495; 414/523
[58] Field of Search .......................... 198/370.01, 370.06; 414/495, 523

[56] References Cited

U.S. PATENT DOCUMENTS

| | | | |
|---|---|---|---|
| 3,616,895 | 11/1971 | LoPresti et al. | 198/185 |
| 4,004,681 | 1/1977 | Clewett et al. | 198/796 |
| 4,102,448 | 7/1978 | Wolbrink et al. | 198/365 |
| 4,378,062 | 3/1983 | Macrum | 198/365 |
| 4,763,771 | 8/1988 | Geerts | 198/370.06 |
| 5,161,930 | 11/1992 | Canziani | 198/370.06 |
| 5,443,351 | 8/1995 | Pettijohn | 414/523 |

FOREIGN PATENT DOCUMENTS 2 197 633   5/1988   United Kingdom .

Primary Examiner—David A. Bucci
Assistant Examiner—Douglas Hess
Attorney, Agent, or Firm—Burns, Doane, Swecker & Mathis, L.L.P.

[57] ABSTRACT

A conveying/sorting apparatus includes a truck movable along a fixed route and possessing a vertically movable platform that can support objects. The truck delivers the articles to respective collection stations disposed along the route. Pairs of plates are connected between the platform and truck to reinforce the platform against horizontal forces. Each pair of plates includes an upper plate hinged to the platform, and a lower plate hinged to the truck, with the plates hinged to one another to be able to fold and unfold in response to vertical movement of the platform.

4 Claims, 5 Drawing Sheets

5,894,919

MOBILE TRUCK WITH TRANSPORT PLATFORM THAT CAN BE POSITIONED AT A NUMBER OF LEVELS

BACKGROUND OF THE INVENTION

The subject of this invention is a truck for use in conveying/sorting plants.

In such a plant (see FIG. 2), a number of trucks T are provided which are movable along a fixed route R. Each truck T carries a rotating apron A which constitutes a transport platform for objects to be sorted. Each truck is fitted with systems able to position the apron at a number of levels so that the objects can be unloaded into collection devices C disposed along the route and situated at different heights. In order to guarantee the necessary unloading precision, the inlets of these collection devices must be sufficiently large in the horizontal direction, usually at least equal to the length of the trucks.

For this reason, one of the problems which faces the designer of this type of equipment is how to increase the number of outlets in a sorting machine without increasing the length of the plant.

One known solution to this problem involves the use of relatively short unloading hoppers containing devices which further sub-divide the route so as to direct the unloaded objects towards a number of final collectors. This serves to increase the number of outlets without affecting the length of the plant. However, this system is only suitable for equipment designed to handle objects of limited size. If larger objects such as parcels are to be handled, there is a risk of their obstructing the hoppers, thus jamming the machine.

For this reason it has been proposed to provide each collection device with a pair of top and bottom outlets, each directed to a respective final container. The transport platform would be adjusted to a height corresponding to that of the particular outlet into which the objects are to be unloaded.

Commonly owned Patent GB 2,197,633 of the same inventor relates to a truck with a transport platform that can be positioned at different heights by means of a device comprising a pantograph support or an articulated parallelogram, driven by an actuator via a nut and bolt coupling.

These lifting devices pre-position the transport platform at a height corresponding to that of the respective unloading outlet of a collection device, but when they are in the extended (raised) position they are not very rigid, with the result that oscillation is liable to occur because of the horizontal thrusts to which the truck is subjected. Those oscillations can cause, if not an overturning of the load, then at the very least a poor positioning of the load on the transport platform, with the result that the subsequent unloading operation is also imprecise.

The purpose of this invention is to design a truck for conveying/sorting plants, heaving an adjustable-height transport platform which eliminates the annoying oscillation problems mentioned above.

Another purpose of the invention is to design a truck with an adjustable-height transport platform which is reliable in operation and simple and inexpensive to manufacture.

SUMMARY OF THE INVENTION

Those and other purposes, which will be described in greater detail below, are achieved by providing a truck with an adjustable-height transport platform, and connecting a reinforcement structure between the platform and truck. The reinforcement structure comprises at least one pair of upper and lower plates. The upper plate is hinged to the platform, the lower plate is hinged to the truck, and the plates are hinged together. The hinge axes are all parallel. The plates can thus fold and unfold in response to vertical movement of the platform to reinforce the platform against horizontal forces.

BRIEF DESCRIPTION OF THE DRAWING

This invention will now be described in detail, by way of example but not of limitation, by reference to the annexed figures in which.

DETAILED DESCRIPTION OF A PREFERRED EMBODIMENT OF THE INVENTION

Figure 1:
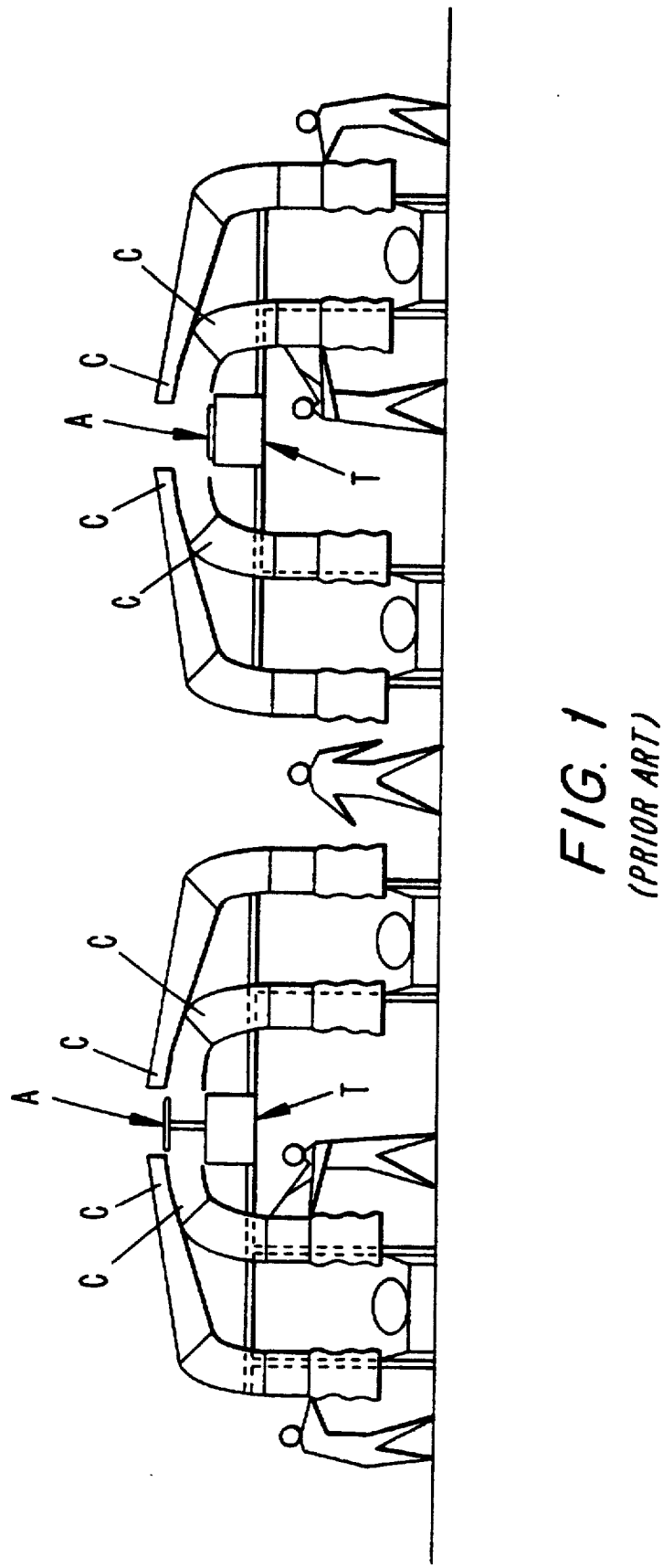
FIG. 1 is a schematic side view of a prior art sorting plant with trucks having an apron that can be positioned at two levels.
Figure 2:
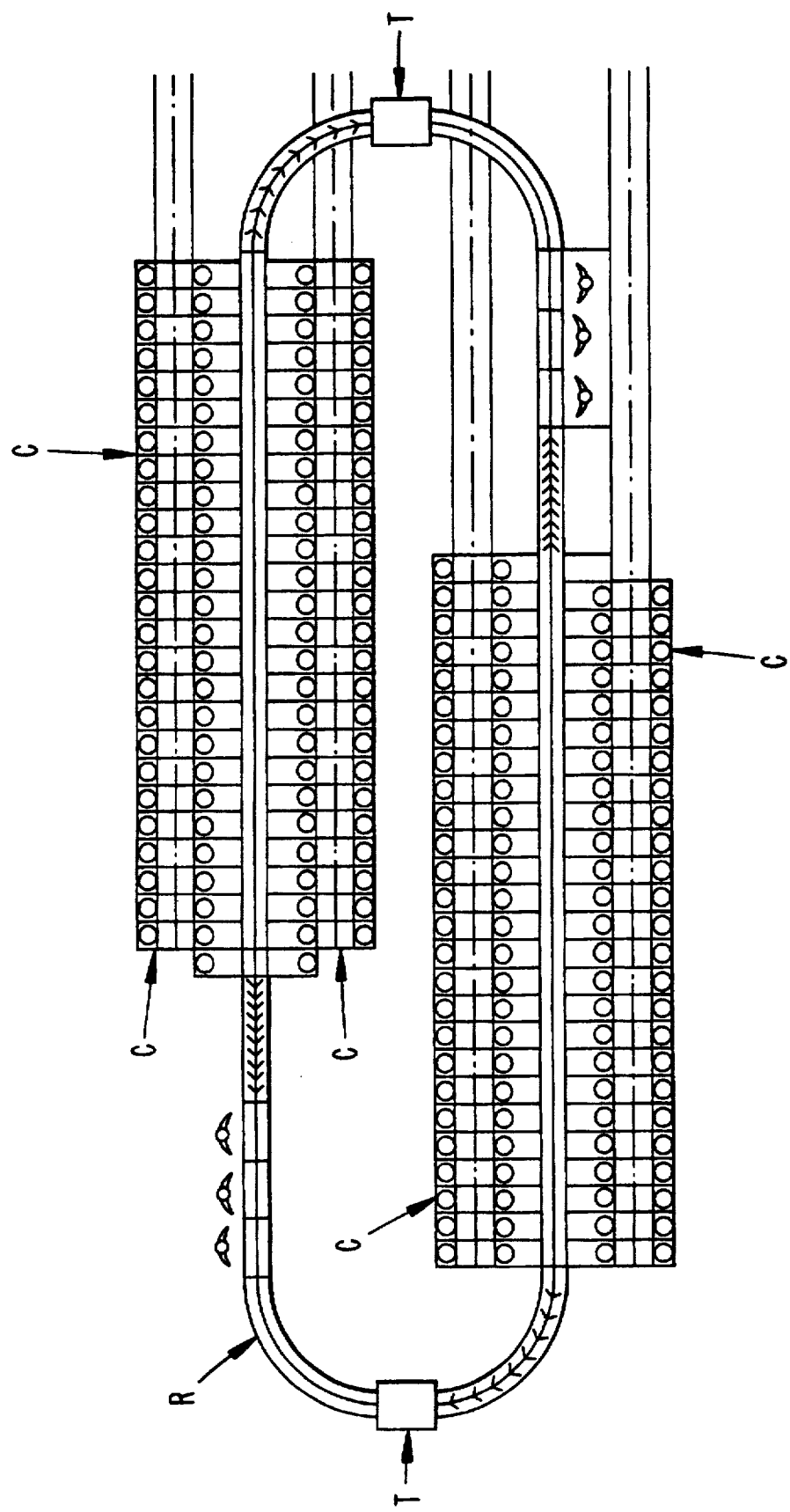
FIG. 2 is a top plan view of a prior art sorting plant.
Figure 3:
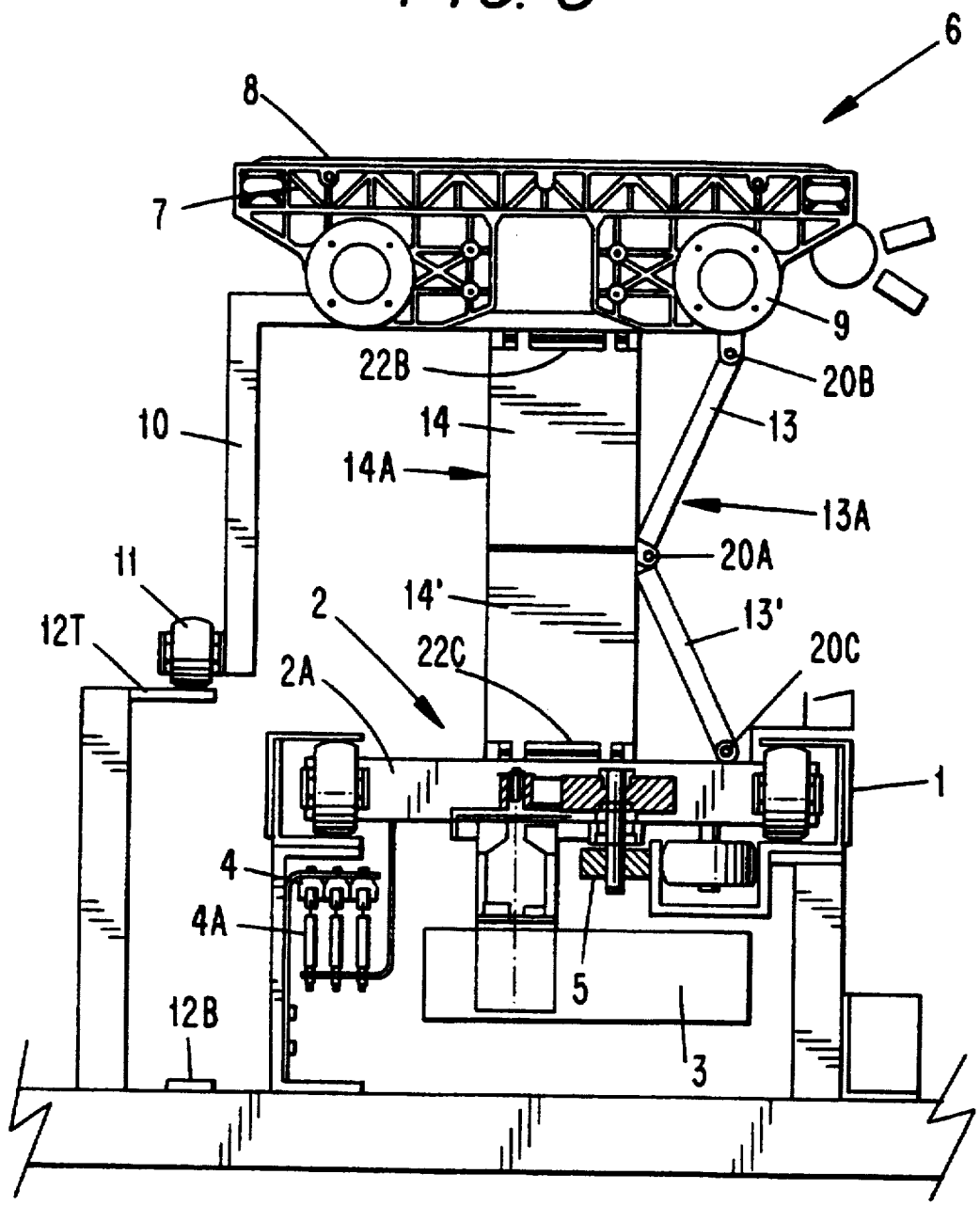
FIG. 3 is a side view of a truck in accordance with the present invention, with the platform thereof in a raised position.

In FIG. 3, there are shown tracks 1, along which a number of trucks 2 move, the truck driven by a motor 3. The motor, which may, for example, be the direct current type, is powered via brushes 4A which engage respective feed rods 4, located along the tracks 1. The motor transmits motion to a drive wheel 5 of the truck.

A transport platform 6 is positioned on each truck 2. This transport platform 6 comprises a chassis 7 to which is fitted a rotating apron 8, i.e., an endless belt, which constitutes the actual transport platform, and is made to rotate at the time of object-unloading, by a motor 9 mounted on the chassis.

Chassis 7 is fitted with arms 10, only one of which is shown in the figure, on which are mounted idler rollers 11 which rest on and move along fixed guides 12.

Figure 6:
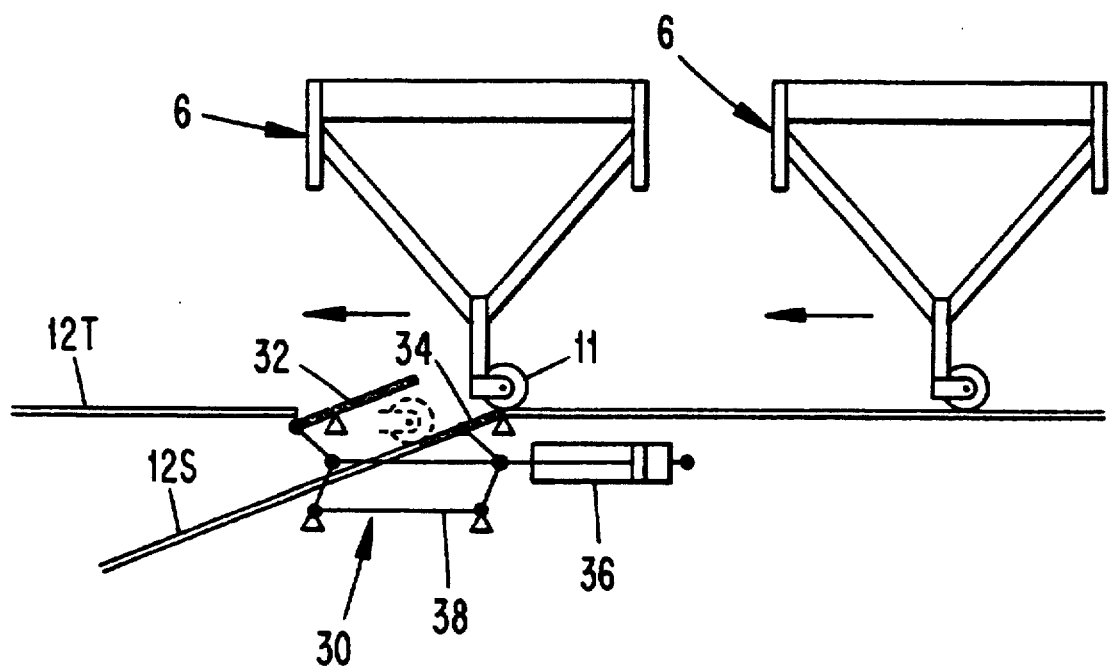
FIGS. 6 and 7 are schematic views of a prior art platform-positioning apparatus in two different states.
Figure 7:
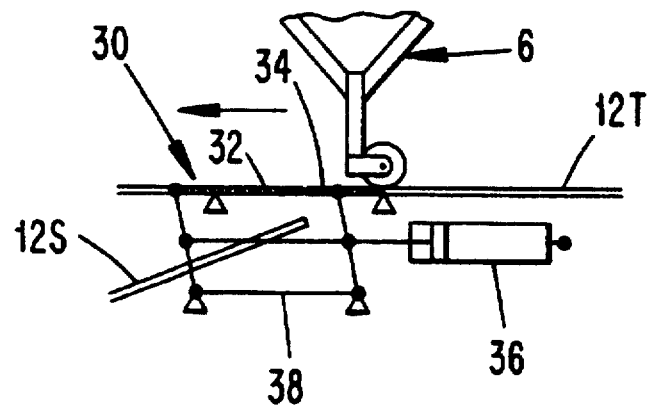

Positioning devices of a known type are situated along the fixed route of the tracks 1 and are activated to deviate rollers 11 towards one of a pair of top and bottom guides 12T, 12B, in order to position platform 6 at different heights. One such positioning device is depicted in FIGS. 6 and 7. FIG. 6 shows a transport platform 6 traveling along the top guide 12T. A downwardly inclined transfer track 12S is provided for transferring the platform 6 down to the bottom guide (not shown in FIG. 6). Access of the wheel 11 to the transfer track can be blocked by a switching track apparatus 30 which includes first and second pivotably mounted switching tracks 32, 34. Those switching tracks 32, 34 are simultaneously movable under the action of a fluid cylinder 36 and a parallelogram linkage 38. In FIG. 6 the switching tracks 32, 34 have been pivoted to parallel inclined states such that the second switching track 34 is aligned with the transfer track 12S to direct the wheel 11 thereto, and the first switching track 32 maintains the wheel 11 in contact with the second switching track 34.

In FIG. 7, the switching tracks 32, 34 are in a mutually aligned state in alignment with the top guide 12T, to ensure that the wheel 11 remains on the top guide 12T.

Similar switching apparatuses are provided for guiding the platform 6 from the bottom guide 12B to the top guide 12T.

Figure 4:
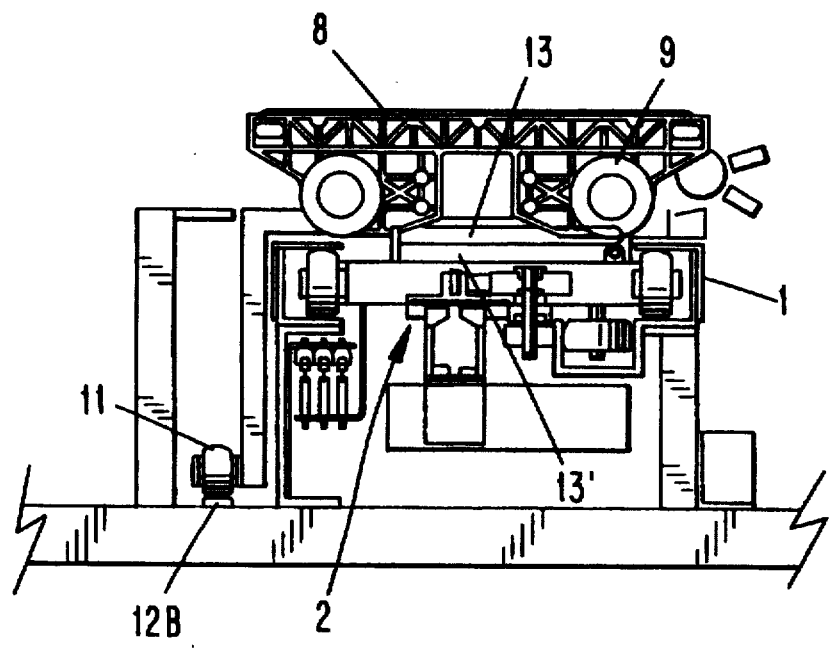
FIG. 4 is a side view of the truck of FIG. 3 with the platform in the lowered position.
Figure 5:
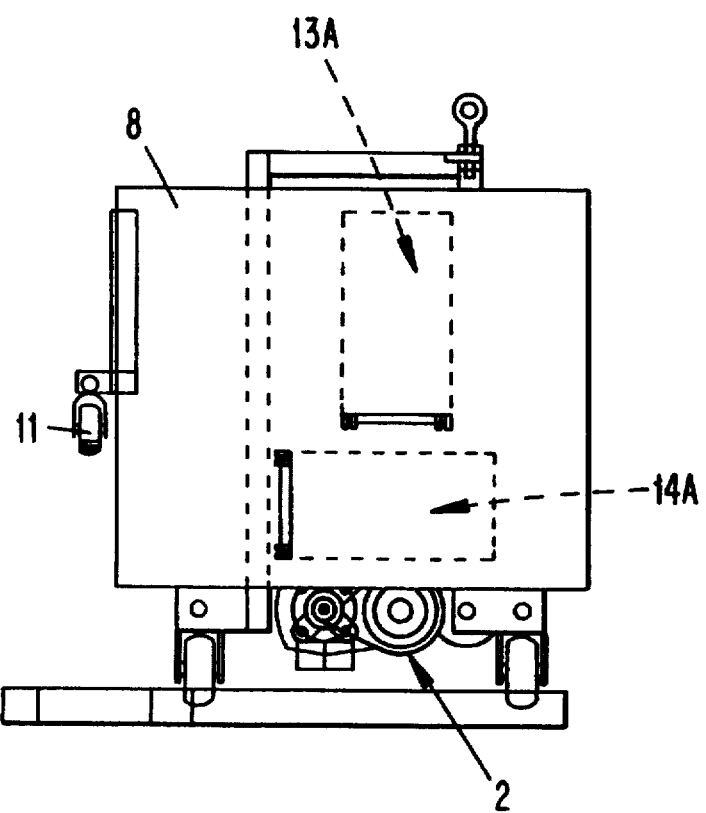
FIG. 5 is a top plan view of the truck shown in FIG. 4.

Returning to FIGS. 3–5, it can be seen that there are hinged to the chassis 7 two sets of plates 13A and 14A, respectively. The set 13A comprises upper and lower plates 13 and 13' which are hinged together by a hinge pin 20A. The upper end of the upper plate 13 is hinged to the underside of the chassis 7 by a hinge pin 20B. The lower end of the lower plate 13' is hinged to the top of a frame 2A of the truck 2 by a hinge pin 20C. The hinge pins 20A, B, C are oriented parallel to one another.

Likewise, the other set 14A comprises upper and lower plates 14, 14' similarly mounted, with the hinge axes of the set 14A extending perpendicular to the hinge axes 20A of the set 13A.

The sets of plates 13A and 14A can fold (FIG. 4) and unfold (FIG. 3) to an extent depending on the height at which the platform 6 is positioned, but simultaneously absorbing the horizontal forces which are exerted on platform 6 and transmitted to the truck 2.

Basically, these plates 13, 13' and 14, 14' act as bracing elements which strengthen the truck/transport platform assembly.

The result is a practical, inexpensive way of coupling the transport platform to the truck of a sorting machine and guaranteeing perfect resistance to horizontal stresses.

The size and the materials used can obviously vary, depending on operational requirements.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A transport apparatus; comprising:
    a truck movable along a fixed route;
    a transport platform mounted on the truck for vertical movement with respect thereto, the platform including a chassis and an article-supporting apron mounted on the chassis; and
    at least one pair of upper and lower plates interconnecting the chassis and the truck, the upper plate hinged to the chassis for rotation about a substantially horizontal first axis, the lower plate hinged to the truck for rotation about a substantially horizontal second axis, and the upper and lower plates hinged together about a substantially horizontal third axis, the first, second, and third axes being parallel to one another, the plates being foldable and unfoldable in response to vertical movement of the platform for absorbing horizontal forces applied to the platform; wherein there are two of the pairs of plates, the hinge axes of one of the pairs of plates extending perpendicularly with respect to the hinge axes of the other pair of plates.

2. The apparatus according to claim 1 wherein the chassis carries a wheel adapted to ride on a fixed guide.

3. A conveying sorting apparatus comprising:
    a fixed track defining a route;
    a plurality of collection stations disposed along the route, each collection station including a pair of vertically spaced inlets; and
    a transport device movable along the track, comprising:
        a truck movable along the track;
        a transport platform mounted on the truck for vertical movement with respect thereto, the platform including a chassis and an article-supporting apron mounted on the chassis, and
        at least one pair of upper and lower plates interconnecting the chassis and the truck, the upper plate hinged to the chassis for rotation about a substantially horizontal first axis, the lower plate hinged to the truck for rotation about a substantially horizontal second axis, and the upper and lower plates hinged together about a substantially horizontal third axis, the first, second and third axes being parallel to one another, the plates being foldable and unfoldable in response to vertical movement of the platform for absorbing horizontal forces applied to the platform, wherein there are two of the pairs of plates, the hinge axes of one of the pairs of plates extending perpendicularly with respect to the hinge axes of the other pair of plates.

4. The apparatus according to claim 3 wherein the chassis carries a wheel adapted to ride on a guide.

* * * * *